United States Patent
Gupta et al.

(10) Patent No.: US 10,925,070 B2
(45) Date of Patent: Feb. 16, 2021

(54) ACCESS POINT UPDATE

(71) Applicant: HEWLETT PACKARD ENTERPRISE DEVELOPMENT LP, Houston, TX (US)

(72) Inventors: Gopal Gupta, Bangalore (IN); Gopal Agarwal, Bangalore (IN); Sumit Kumar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/261,959

(22) Filed: Jan. 30, 2019

(65) Prior Publication Data
US 2020/0241866 A1   Jul. 30, 2020

(51) Int. Cl.
*G06F 9/44*    (2018.01)
*H04W 72/06*   (2009.01)
(Continued)

(52) U.S. Cl.
CPC .............. *H04W 72/06* (2013.01); *G06F 8/65* (2013.01); *H04L 41/12* (2013.01); *H04L 43/14* (2013.01);
(Continued)

(58) Field of Classification Search
CPC . G06F 8/61; H04L 41/12; H04L 41/22; H04L 43/14; H04W 24/02; H04W 72/02;
(Continued)

(56) References Cited

U.S. PATENT DOCUMENTS 8,826,444 B1   9/2014   Kalle
8,830,913 B1 *  9/2014   Sosa .................... H04W 48/20
                                                    370/328
(Continued)

FOREIGN PATENT DOCUMENTS

CN         104244306         12/2014

OTHER PUBLICATIONS

"Ordinal Regression", available online at <https://web.archive.org/web/20180901000000*/http://www.norusis.com/pdf/ASPC_v13.pdf>, Jun. 19, 2018, pp. 69-89.
(Continued)

*Primary Examiner* — Tuan A Vu
(74) *Attorney, Agent, or Firm* — McDermott Will & Emery

(57) ABSTRACT

Systems and methods are provided for seamless and automatic upgrade of access points in a facility with minimal disruption, particularly, for important users of a network. The access points may be ranked, and the rankings may be aggregated to identify a sub-region of the facility with the lowest ranked access points. Various sub-sets of the access points in the identified sub-region can be updated separately so that spatial coverage by the other sub-sets maintains continuous access within the sub-region during the updates. Updates to later sub-sets and/or sub-regions can be performed contingent on the success of the earlier updates. In this way, updates can be verified on access points used by lower-priority users such as guest users of the network to avoid disruption of access to more important users such as executives or safety workers on the network.

13 Claims, 5 Drawing Sheets

(51) Int. Cl.
*G06F 8/65* (2018.01)
*H04W 24/10* (2009.01)
*H04W 88/08* (2009.01)
*H04W 24/02* (2009.01)
*H04W 24/08* (2009.01)
*H04L 12/24* (2006.01)
*H04L 12/26* (2006.01)

(52) U.S. Cl.
CPC ............ *H04W 24/02* (2013.01); *H04W 24/08* (2013.01); *H04W 24/10* (2013.01); *H04W 88/08* (2013.01)

(58) Field of Classification Search
CPC ..... H04W 64/00; H04W 48/20; H04W 4/029; H04W 24/10; H04W 24/08; H04W 88/08; H04W 72/06; G01S 5/0236
See application file for complete search history.

(56) References Cited

U.S. PATENT DOCUMENTS

| | | | |
|---|---|---|---|
| 9,602,345 B2 | 3/2017 | Saha et al. | |
| 9,800,686 B2 | 10/2017 | Agarwal et al. | |
| 2009/0042557 A1* | 2/2009 | Vardi | H04W 72/02 455/422.1 |
| 2010/0151858 A1* | 6/2010 | Brisebois | H04W 24/10 455/434 |
| 2013/0260782 A1* | 10/2013 | Un | H04W 64/00 455/456.1 |
| 2014/0120945 A1* | 5/2014 | Sharma | G01S 5/0236 455/456.1 |
| 2015/0178070 A1* | 6/2015 | Doi | G06F 8/61 717/172 |
| 2016/0036833 A1 | 2/2016 | Ardeli et al. | |
| 2016/0066200 A1* | 3/2016 | Dayanandan | H04W 24/02 370/252 |
| 2016/0373306 A1* | 12/2016 | Saha | H04L 41/12 |
| 2018/0220314 A1 | 8/2018 | Chen et al. | |
| 2018/0310122 A1* | 10/2018 | Xue | H04W 4/029 |
| 2019/0116504 A1* | 4/2019 | Rusackas | H04L 41/22 |

OTHER PUBLICATIONS

Alan Agresti, "Modeling Ordinal Categorical Data", Oct. 23, 2010, pp. 1-75.

* cited by examiner

ACCESS POINT UPDATE

BACKGROUND

Background

Access point (AP) software and firmware updates can be one of the most challenging operations performed for management of wireless networks. Errors during the upgrade will lead to loss of network access, which can lead to loss of business, or even safety issues if communications are disabled.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
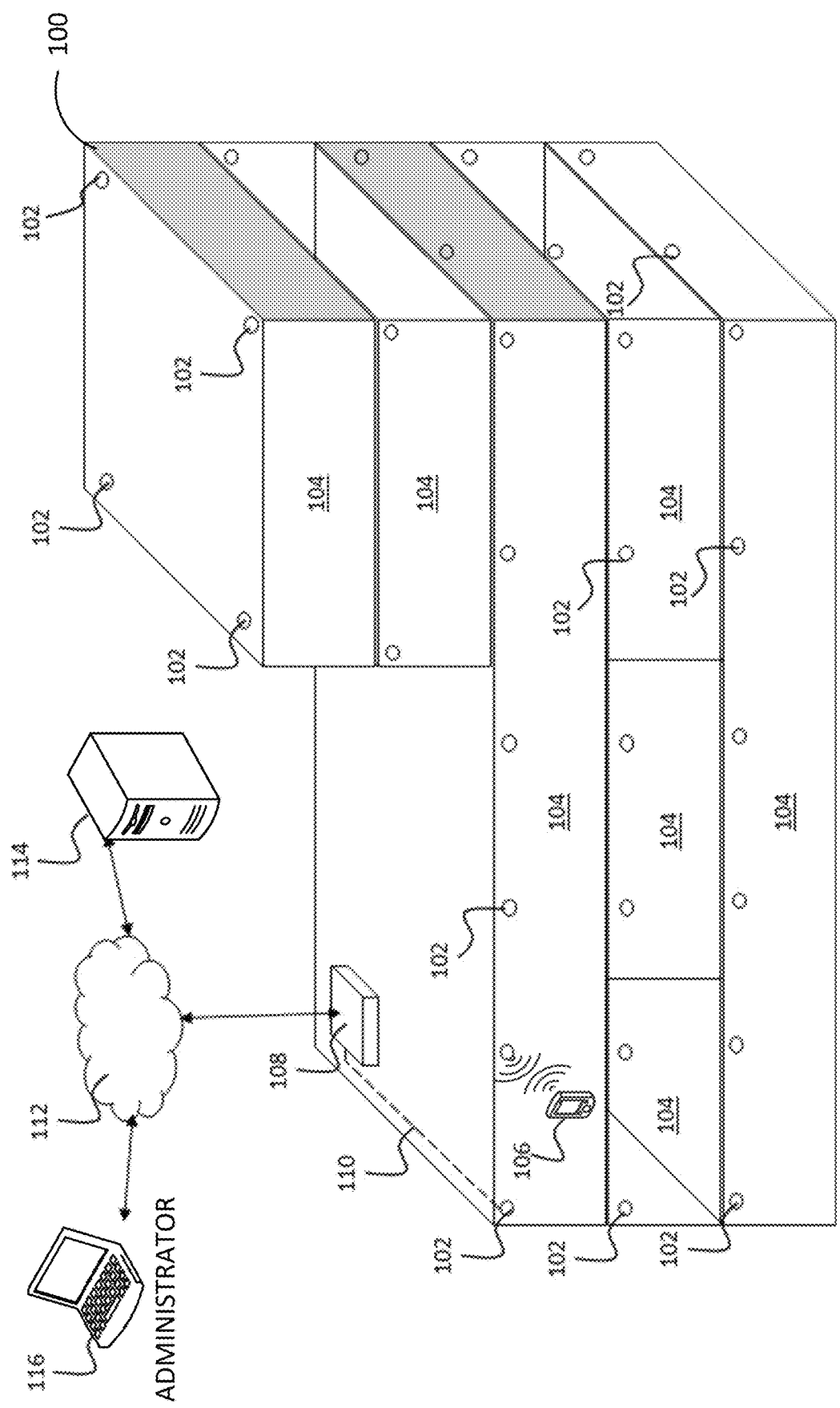
FIG. 1 illustrates an example architecture suitable for access point update systems and methods, according to aspects of the disclosure.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Systems and methods for software and/or firmware updates for access points (APs) are disclosed. The disclosed systems and methods may rank all of the access points in a facility such as an airport, an office, a hospital, a stadium, etc. to identify APs that would have the least impact to the facility's most important users, if a firmware or software update fails. The APs are then updated from the lowest ranked to the highest ranked, pending the health of the previously updated set of APs. In this way, update-related connectivity issues are avoided for high-priority users (such as C-level executives or safety personnel), by updating APs that are used for lower-priority users (such as guest users) first, and continuing updates of other APs pending the success of the last update group. In accordance with various aspects, upgrading the APs may include selecting sub-regions of a facility having a low aggregate ranking score for the APs in that sub-region, and then selecting sub-sets of APs within a sub-region to ensure continuous coverage. In accordance with various aspects, the ranking scores for each AP can be based on a weighted combination of parameters. Weights for the weighted combination can be determined using machine-learning in some scenarios.

The present disclosure addresses the problem arising in computer technology, in which firmware or software for access points that are currently providing network access to a network needs to be updated, without disrupting access to the network. This can be particularly important for security or safety personnel, executive-level employees of a company, or particularly data-heavy users (as examples).

For example, at an airport or stadium that spans a large physical area with access points distributed within that area, administrative users that are accessing a network to coordinate aircraft-related activities are higher priority users of the network than guest users such as travelers that are accessing the network for entertainment. In accordance with aspects of the disclosure, the access points providing the network access to the guest users can be updated first to ensure that the upgrade is successful, prior to upgrading the access points for the administrative users. In this way, any impact of problems with the upgrade on the administrative users can be reduced or avoided.

As another example, wireless network deployment in an office building can be provided by access points distributed on various floors of the office building, and/or within various sections of a floor. Within the office building, users at various privilege levels can be accessing the network via the various APs. For example, the users may include high-privilege users (e.g., the chief executive officer (CEO) or other executive-level employees, sales team members, customer support team members, managers, or the like), medium-privilege users (e.g., support staff members, human resources employees, engineering team members, or the like), and low-privilege users (e.g., guests). APs providing access for low-privilege users can be updated first, and the APs providing access for medium and high-privilege users pending the health of the updated APs for the low-privilege users. In this way, any impact of problems with the upgrade on the high-privilege and/or medium-privilege users can be reduced or avoided.

The systems and methods disclosed herein can provide less disruptive upgrades to access points (e.g., by upgrading and sampling low risk APs and, if they are successful, upgrade other APs), and help reduce the impact of upgrades to critical users.

More generally, the systems and method disclosed herein provide seamless and automatic AP firmware and/or software upgrades. A network administrator can specify an update, and the detailed upgrade process (including decisions as to which AP should be upgraded when and in what sequence) can be performed without further input by the administrator. The upgrade is thus performed by upgrading high-priority APs and performing scaled-environment setup at or near the end of the upgrade operations in order to mitigate impacts due to regression issues that can be caused by implementing an upgraded image. Instead of sequentially upgrading APs, the systems and methods disclosed herein pick and choose APs for update, such that there is minimum impact if there are unexpected scale and/or functional failures due to the upgraded image.

In accordance with aspects of the present disclosure, a computer-implemented method is described that includes determining a ranking score for each of a plurality of access points distributed across at least two sub-regions of a facility. The method also includes determining, based on a combination of the ranking scores for the access points physically located within a boundary of each of the at least two sub-regions, a sub-region ranking score for each sub-region. The method also includes identifying, for the sub-region with a low sub-region ranking score, a plurality of sub-sets of the access points in that sub-region. The method also includes determining, based on a combination of the ranking scores for the access points in each sub-set, a sub-set ranking score for each sub-set. The method also includes identifying the sub-set associated with a low sub-set ranking score. The method also includes performing an update of the access points in the identified sub-set with the low sub-set ranking score.

In accordance with other aspects of the present disclosure, a computer-implemented method is described that includes determining a ranking score for each of a plurality of access points distributed within a facility, wherein the ranking score for each of the access points is based on a location score, a user task score, a user role score, a user connection duration, a bandwidth score, and a traffic score. The method also includes updating firmware of each of the access points in an order from the access point having a lowest ranking score to the access point having a highest ranking score.

In accordance with other aspects of the present disclosure, a system is described that includes a memory storing instructions; and one or more processors configured to execute the instructions to: determine a ranking score for each of a plurality of access points distributed across at least two sub-regions of a facility; determine, based on a combination of the ranking scores for the access points in each of the at least two sub-regions, a sub-region ranking score for each sub-region; identify, for the sub-region with a lowest sub-region ranking score of the sub-region ranking scores, a plurality of sub-sets of the access points in that sub-region; determine, based on a combination of the ranking scores for the access points in each sub-set, a sub-set ranking score for each sub-set; identify the sub-set with a lowest sub-set ranking score of the sub-set ranking scores; and perform an update of the access points of the identified sub-set with the lowest sub-set ranking score.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example architecture suitable for access point updates, according to aspects of the disclosure. The architecture of FIG. 1 includes access points 102 distributed within a facility 100.

Access points 102 provide wireless access to a network such as network 112 for user devices, such as user device 106. User devices 106 may be mobile electronic devices such as smart phones or tablets, laptop computers, desktop computers, or other electronic devices having wireless communications components. Access points 102 may be configured for wireless communications with user devices 106 and may be communicatively coupled to network 112 via a wired connection 110 to an interface 108 (e.g., a modem, switch, and/or router). Interface 108 provides communication between user devices 106 (via access points 102) and other devices, such as server 114. Network 112 may be an internal network for facility 100 or may be an external network such as the Internet. Server 114 may be a network management server that controls updates to access points 102 and/or otherwise manages the architecture of FIG. 1.

In the example of FIG. 1, an administrator device 116 is coupled to interface 108 and access points 102 via network 112. However, it should be appreciated that administrator device 116 can be coupled to access points 102 and/or server 114 via an internal network within facility 100 via a wired or wireless interface.

As shown in FIG. 1, APs 102 can be distributed within each of several sub-regions 104 of facility 100. As shown, sub-regions 104 can be separate floors of a multi-story building and/or can be sections of a single floor in the building. Although facility 100 of FIG. 1 is implemented as a multi-story building with five stories, one including multiple sections, it should be appreciated that facility 100 may be a single story facility, an outdoor facility, an airport, an office building, a stadium, a shopping mall, a station, a park, a library, a public wireless network access area such as a free wireless network zone provided indoors or outdoors by a company or a government agency, or any other facility having multiple access points distributed therein.

Administrator device 116 may be used to initiate or authorize a software and/or firmware update for access points 102. However, because one or more user devices 106 may be actively connected to network 112 via access points 102, server 114 may be used to perform the updates to access points 102 in an order that reduces the impact of any potential upgrade failure on high-priority or critical tasks being executed by high-priority users. In this way, server 114 manages the update in a manner that provides a smooth, seamless, automatic upgrade of the access points at the facility, with minimized service disruptions.

For example, server 114 may determine a ranking score for each AP 102, rank each sub-region 104 based on the ranking scores for the APs in that sub-region (e.g., based on the criticality of the connections in that sub-region, which may be determined using various feature weights that can be determined based on an ordinal regression machine-learning model), upgrade APs 102 in the sub-region 104 that has a lowest ranking first, and, pending the upgrade success for the low priority (e.g., low ranking) sub-region(s) 104, upgrade higher priority sub-regions 104 with higher ranking scores. Further details regarding the determination of ranking scores for APs 102, and the aggregation of scores within a sub-region for sub-region ranking, are described in further detail hereinafter.

Server 114 may also identify sub-sets of APs 102 in each sub-region, each sub-set providing at least partially overlapping (e.g., redundant) spatial signal coverage for the devices in that sub-region. The sub-sets can be updated (e.g., upgraded) separately to ensure continuous coverage, even within a sub-region, for devices 106 in each sub-region.

Figure 2:
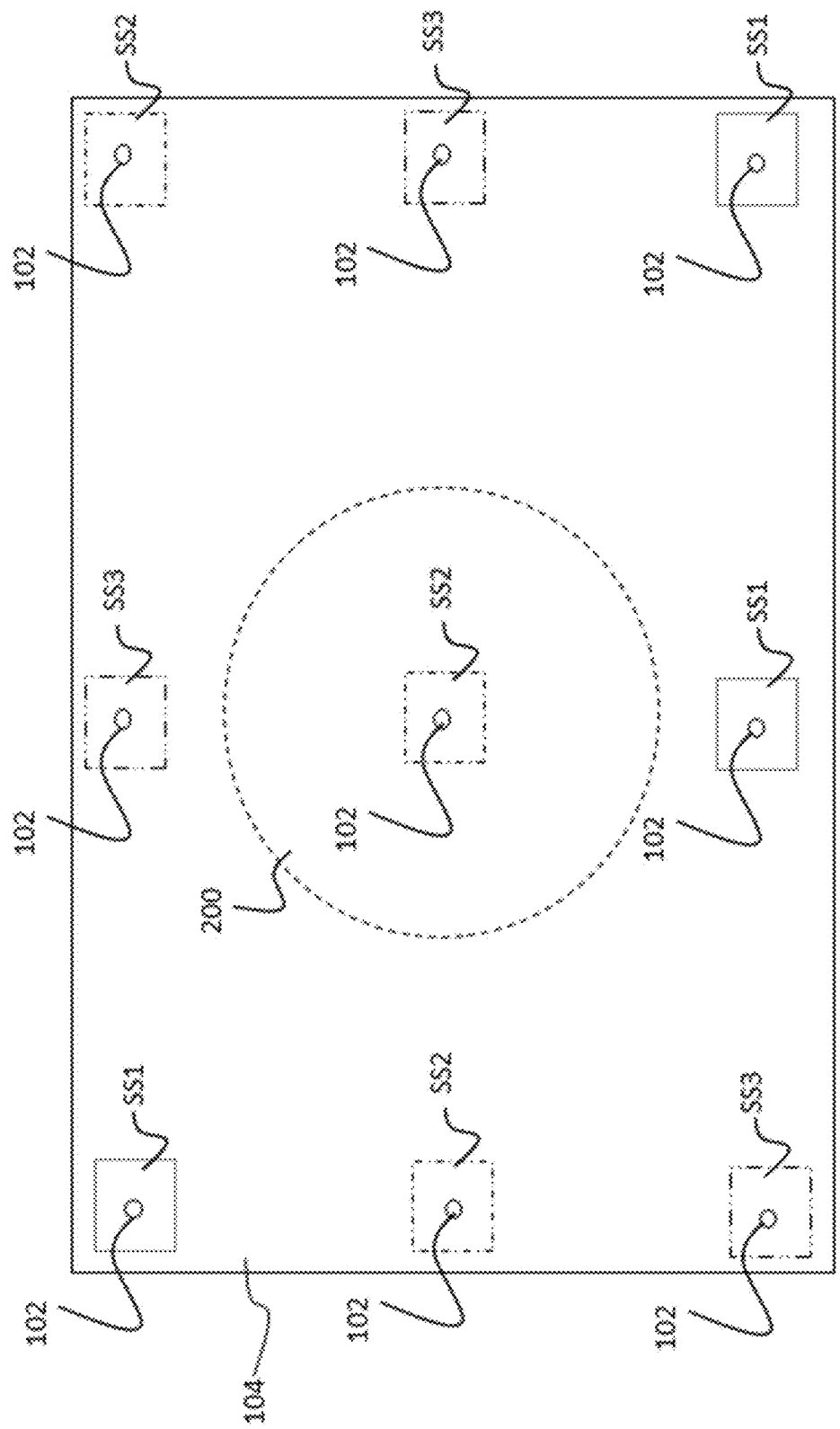
FIG. 2 illustrates a sub-region of the facility from the architecture of FIG. 1, according to aspects of the disclosure.

FIG. 2 shows a schematic top view of one of sub-regions 104. As shown in FIG. 2, multiple APs 102, each having a coverage area 200 within which access for a user device 106 can be provided, may be spatially distributed within a sub-region 104. Although the coverage area 200 for only one of APs 102 is shown, it should be appreciated that each AP 102 may have a similar coverage area and that the coverage areas of multiple APs may spatially overlap to provide redundant coverage in some or all of the sub-region 104. Accordingly, APs 102 within sub-region 104 can be selectively taken offline for updating, while other APs 102 remain online to provide continuous signal coverage in some or all of sub-region 104 during the updates.

For example, one or more sub-sets of APs 102 in sub-region 104 can be identified such that each of the sub-sets provides at least partially redundant spatial signal coverage to at least another one of the sub-sets. In the example of FIG. 2, three sub-sets SS1, SS2, and SS3 are identified, each sub-set including three of the nine APs in sub-region 104. By updating the software or firmware of the APs 102 of SS1, SS2, and SS3 separately, the signal coverage within sub-region 104 can be maintained by the non-updating sub-sets at any given time. Sub-sets SS1, SS2, and SS3 can be updated in numerical order, in a randomized order, or based on a sub-set ranking score based on an aggregate or combination of the ranking scores of the APs in that sub-set.

The APs within a sub-set can be updated in parallel or sequentially. In one example, a single AP in a sub-set can be updated first and, pending the success of that update, two, three, more than three, or a continuously (e.g., exponentially) increasing number of APs can then be updated in parallel until the sub-set is fully updated. Updating the APs of a sub-set in this way can uncover an unexpected scaling issue for a particular upgrade, before the scaling issue affects high-priority users.

If a sub-set has been successfully upgraded, the other AP sub-sets may be updated (e.g., in increasing order of their sub-set ranking score) until all sub-sets in a sub-region have been upgraded. In case of an upgrade failure for any AP or sub-set of APs, upgrade failure rollback operations may be performed. Upgrade failure rollback operations may include rolling back the firmware and/or software for the APs with the failed upgrade, and ceasing upgrade operations for the other access points within the same subset that have not yet completed the upgrade until a fix is implemented for the failure.

In the example of FIG. 2, each of sub-sets SS1, SS2, and SS3 have equal numbers of APs. However, in some scenarios, sub-sets with differing numbers of APs can be used.

APs 102 may be initially ranked based on the priority of the user or users that access network 112 via that access point. The priority of the user(s) can be determined based on the location of the access point (e.g., in a C-suite sub-region 104 of facility 100 in which offices of the CEO, COO, CFO, or other C-level executives have offices, as opposed to a public access area such as a terminal of an airport or an office lobby), based on the identity of devices or device users that connect to that AP (e.g., using device identifiers and associated user information), or other ranking parameters. A ranking score for each AP 102 may be determined (e.g., by server 114) based on one or more of these ranking parameters (e.g., based on a weighted combination of the ranking parameters).

For example, when a new upgrade is notified (e.g., by administrator device 116), a ranking score may be determined for every AP 102 in facility 100. The ranking score for each AP is computed based on one or more ranking parameters such as a location score, a user task score, a user reputation score, a bandwidth score, a traffic score, a duration score, or a user role score.

The location score may be a numerical value that is higher for physical locations where critical tasks are commonly, or currently, being executed. For example, a location score may be higher for high-priority locations such as a sales team office, a CEO office, or a technical support team area. High-priority locations may be identified by an administrator of the network. APs 102 in these high-priority locations will be assigned relatively high location scores, which may be normalized counts of high-priority users in the location, and which may be denoted 'Hpl' herein for convenience.

The user task score may be a numerical value that is based on a number of VIP users of an access point, which are defined as users that are currently executing, or that commonly execute critical tasks, regardless of location. VIP users can be identified by an administrator based on a user identifier, or based on an analysis of the user's activity. APs 102 to which VIP users are connected will be assigned higher ranking scores than other APs. The user task score may be a normalized (e.g., using a Z-score or mathematical variant thereof) number of VIP users, and may be denoted herein as 'Vuser' for convenience.

The user reputation score may be a numerical value based on a reputation of one or more users of an AP. The user reputation score may be based on content accessed by the user. For example, accessing of malicious content by a user will reduce the user reputation score for the user. The user reputation score for an AP may be a normalized (e.g., using a Z-score or mathematical variant thereof) average user reputation value for all users of an AP, and may be denoted herein as 'Urep' for convenience.

The bandwidth score for each AP may be a numerical value that is relatively higher for APs with high bandwidth usage than for other APs, as this indicates that the AP is highly utilized. High bandwidth usage may indicate high criticality of tasks being performed. The bandwidth score may be a normalized (e.g., using a Z-score or mathematical variant thereof) AP bandwidth value, and may be denoted herein as 'APbw' for convenience.

The traffic score may be a numerical value that is higher for APs for which most client traffic is going to high-priority queues, as traffic to these queues may indicate the presence of a high-priority user. The traffic score may be a normalized (e.g., using a Z-score or mathematical variant thereof) aggregated traffic flow for all traffic through an AP over a period of time. For example, high-priority traffic flows may be assigned a highest traffic score N and low priority traffic flows may be assigned a lowest traffic score of one. The traffic score may be denoted herein as 'Hpr' for convenience.

The duration score may be a numerical value that indicates the average or median connection duration for users of an AP. For example, APs 102 with relatively higher average user connection duration times will have a higher ranking score than other APs. This is because, users executing critical tasks will often connect for a longer duration to the AP than, for example, users executing a guest task. The duration score for an AP may be a normalized (e.g., using a Z-score or mathematical variant thereof) average user connection time, and may be denoted herein as 'Uct' for convenience.

The user role score may be a numerical value assigned for each role in an organization. For example, in a corporate context the user role scores may include a CEO score of one, an executive-level score of one-half, a senior vice president score of one third, etc. Guest users may be assigned a guest score of zero or another lowest score value. Different roles may all be assigned different role scores, or some different roles may have the same score (e.g., a researcher might have the same score as a developer). Role scores may be set by an administrator or determined automatically based on known user roles and system-determined scores for those roles. The user role score for an AP may be a normalized (e.g., using a Z-score or mathematical variant thereof) average or maximum user role score for the roles of all users connected to the AP. The user role score may be denoted herein as 'Udeg' for convenience.

Normalizing the ranking parameters using a Z-score or mathematical variant before calculating the ranking score can help in detecting outliers and in comparison between independent features. The Z-score can be changed to a percentile scale in scenarios in which it is desirable to operate in a range between 0-100 with the help of probability density functions.

Once the location score, user task score, user reputation score, bandwidth score, traffic score, duration score, and/or user role score have been determined for an AP, the ranking score for that AP may be determined based on any suitable combination of the location score, user task score, user reputation score, bandwidth score, traffic score, duration score, and/or user role score for that AP. For example, the ranking score for an AP may be a sum, average, or weighted sum of the location score, user task score, user reputation score, bandwidth score, traffic score, duration score, and/or user role score. In one suitable example, the APs 102 are assigned a ranking score, AP Score, using Equation 1 below:

$$AP\ Score = w1*Hpl + w2*Vuser + w3*URep + w4*APbw + w5*Hpr + w6*Uct + w7*Udeg, \quad (1)$$

where Hpl, Vuser, URep, APbw, Hpr, Uct, and Udeg are the ranking parameters defined above, and w1, w2, w3, w4, w5, w6, and w7 are weights related to the respective ranking parameters. APs 102 may then be posteriorly ranked by their resulting ranking scores. Weights w1, w2, w3, w4, w5, w6, and w7 can be assigned by an administrator or determined by server 114 based on the ranking parameters themselves, and/or based on weights and/or ranking parameters previously used for another facility (e.g., by performing an ordinal regression operation such as by using a machine-learning regression model trained with training data associated with a plurality of access points distributed within a different facility).

Once the ranking scores for all APs 102 have been determined, a sub-region ranking score for each sub-region 104 is determined by aggregating (e.g., summing, averaging, or the like) the ranking scores of the APs in that region. The APs of the sub-region 104 with the lowest sub-region ranking score may then be upgraded, followed by the other sub-regions in order of increasing sub-region ranking score. As discussed above, in connection with, for example, FIG. 2, updating the APs in a sub-region may include updating those APs in sub-sets that maintain RF coverage for the given sub-region. Once each sub-region is updated, server 114 may analyze the health of that upgraded sub-region. If the upgraded sub-region is healthy (e.g., the update was successful), server 114 may proceed to update/upgrade the sub-region with the next lowest ranking score. This process may be repeated until all APs 102 in facility 100 are upgraded.

Figure 3:
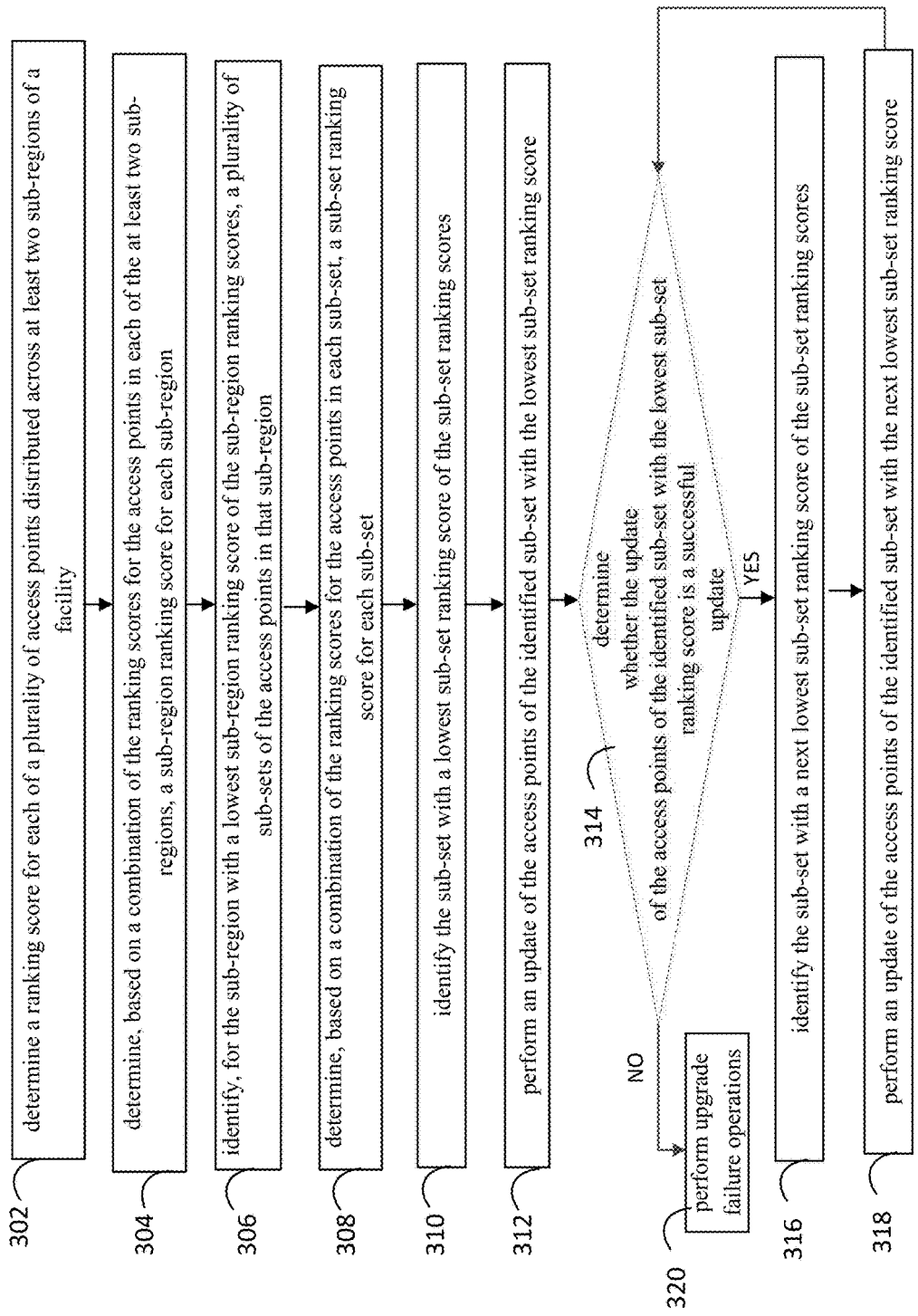
FIG. 3 is a flow chart of illustrative operations for access point updates, according to aspects of the disclosure.

FIG. 3 is a flow chart illustrating operations 300 that can be performed for updating access points distributed within a facility, according to aspects of the disclosure. Operations 300 may be performed, for example, by server 114 of FIG. 1. At least some of the operations 300 may be performed by a computer having a processor executing commands stored in a memory of the computer. Methods consistent with the present disclosure may include at least some, but not all, of the operations 300, performed in a different sequence. Furthermore, methods consistent with the present disclosure may include two or more of operations 300 performed overlapping in time, or almost simultaneously.

At block 302, a ranking score, such as AP Score defined above, is determined for each of a plurality of access points such as APs 102, distributed across at least two sub-regions such as sub-regions 104, of a facility such as facility 100 of FIG. 1. The facility may be one of an airport, an office building, a stadium, a shopping mall, a station, a park, a library, or a public WiFi access area (as examples). The two sub-regions may include a first floor and a second floor of the facility, or two separate sections of the same floor of the facility.

Determining the ranking score for each of the plurality of access points may include determining the ranking score for each access point based on at least one of a location score, a user task score, a user role score, a user connection duration, a bandwidth score, and a traffic score associated with that access point. The ranking score may also, or alternatively, be determined based on a user reputation score. For example, determining the ranking score for each of the plurality of access points may include determining, for each access point, a weighted sum of the location score, the user task score, the user role score, the user connection duration, the bandwidth score, the traffic score, and/or other scores associated with that access point (e.g., using Equation 1 above).

In some scenarios, determining the ranking scores may include determining a weight for each of the location score, the user task score, the user role score, the user connection duration, the bandwidth score, the traffic score, and/or other scores such as the user reputation score. The weights may be determined, for example, using an ordinal regression operation such as by using a machine-learning regression model trained using the ranking parameters and/or ranking parameters and/or weights used at a previous facility upgrade as training data.

In order to determine weights such as weights w1, w2, w3, w4, w5, w6, and w7 above by ordinal regression, the weights are predicted by a machine-learning regression model. In general, ordinal regression is used for predicting an ordinal variable, i.e., a variable whose value exists on an arbitrary scale where only the relative ordering between different values is significant. For example, for ordinal Label Rank with c categories, P(Rank=j), j=1, 2, . . . , c, depends on a feature Xi, which can be categorical and/or quantitative. For categorical features, indicator variables can be used. In some scenarios, the ordinal regression operations may include computing a cumulative Logit model with proportional odds.

For determining weights w1, w2, w3, w4, w5, w6, or w7 for determination of one or more AP ranking scores, the feature Xi can be set to be Hpl, Vuser, Urep, APbw, Hpr, Uct, or Udeg. In this example, rank will be based on criticality. Training data as noted above can be used in the ordinal regression to calculate the feature weights. Examples of training data that can be used for training the model is shown in Table 1 below.

TABLE 1

| Hpl | Vuser | Urep | APbw | Hpr | Uct | Udeg | Rank |
|-----|-------|------|------|-----|-----|------|------|
| 0.3 | 0.4 | 0.6 | 0.8 | 0.1 | 0.3 | 0.4 | 3 |
| 0.4 | 0.5 | 0.7 | 0.9 | 0.4 | 0.5 | 0.4 | 2 |
| 0.6 | 0.7 | 0.9 | 0.8 | 0.8 | 0.8 | 0.5 | 1 |

Once the model has been trained, the model can be used to calculate the feature weights for the APs of a particular facility. These feature weights can then be used in calculating the AP score.

At block 304, a sub-region ranking score for each sub-region 104 is determined, based on a combination (e.g., a sum, an average, or the like) of the ranking scores for the access points 102 in each of the at least two sub-regions 104.

For example, a sub-region 104 may include twelve APs having ranking scores of 0.2, 0.25, 0.23, 0.21, 0.26, 0.27, 0.29, 0.29, 0.34, 0.31, 0.36, and 0.34. This sub-region may have a sub-region ranking score that is a sum of the AP ranking scores, or 3.35. Another sub-region may have a sub-region ranking score of 4.1. Of these examples, the sub-region 104 having the sub-region ranking score of 3.35 would be the lowest ranked sub-region.

At block 306, a plurality of sub-sets of the access points (see, e.g., sub-sets SS1, SS2, and SS3 of FIG. 2) are identified in a sub-region 104 with a relatively low sub-region ranking score (e.g., initially the sub-region with the lowest sub-region ranking score) of the sub-region ranking scores. Each of the plurality of sub-sets provides at least partially redundant or overlapping spatial signal coverage to at least another one of the plurality of sub-sets (e.g., all of the other sub-sets). For example, the twelve APs 102 in the example sub-region described above in connection with block 304 may be divided into four sub-sets of APs that combine to provide overlapping coverage areas in the sub-region.

At block 308, a sub-set ranking score is determined for each sub-set, based on a combination (e.g., a sum, an average, or the like) of the ranking scores for the access points in each sub-set. For example, a first of the four sub-sets may have the three APs with ranking scores of 0.2, 0.25, and 0.23. A sub-set ranking score for this sub-set may be computed as the sum of the three AP ranking scores (e.g., 0.68). Another of the four sub-sets may have three different APs with the ranking scores of 0.21, 0.26, and 0.24. A sum-based sub-set ranking score for this sub-set is 0.71.

At block 310, a sub-set with a relatively low sub-set ranking score (e.g., initially the sub-set with the lowest sub-set ranking score) of the sub-set ranking scores is identified. In the example above, because 0.68 is low relative to 0.71, the first of the four sub-sets having the three APs with ranking scores of 0.2, 0.25, and 0.23 may have a relatively low (or the lowest) sub-set ranking score in the identified sub-region.

At block 312, an update of the access points of the identified sub-set with the low (e.g., lowest) sub-set ranking score is performed (e.g., by upgrading the software and/or firmware of the access points in the identified subset). For example, the firmware for the APs with ranking scores of 0.2, 0.25, and 0.23 may be updated first (e.g., separately or in parallel).

At block 314, server 114 may determine whether the update of the access points of the identified sub-set with the low (e.g., lowest) sub-set ranking score is a successful update (e.g., whether the APs 102 of that sub-set are healthy). For example, server 114 may exchange confirmatory communications with the APs with ranking scores of 0.2, 0.25, and 0.23.

At block 316, if the update of the access points of the identified sub-set with the low (e.g., lowest) sub-set ranking score are healthy, the sub-set with a higher (e.g., the next lowest) sub-set ranking score of the sub-set ranking scores is identified. For example, the sub-set with the sub-set ranking score of 0.71 may be identified.

At block 318, an update of the access points of the identified sub-set with the higher (e.g., the next lowest) sub-set ranking score is performed. For example, the APs with the ranking scores of 0.21, 0.26, and 0.24 may be updated next. As indicated in FIG. 3, the operations of blocks 314, 316, and 318 can be repeated until all of the APs in the sub-region with the lowest sub-region ranking score have been updated. The operations of blocks 306-318 can then also be repeated for all other sub-regions in order of next lowest to highest sub-region ranking score.

If, at block 314, the update of the access points of the identified sub-set with the low (e.g., lowest) sub-set ranking score are not healthy, server 114 may proceed to block 320, at which upgrade failure operations may be performed. Upgrade failure operations may include performing an upgrade rollback for the identified sub-set with the lowest sub-set ranking score, and ceasing upgrade operations for the access points.

Figure 4:
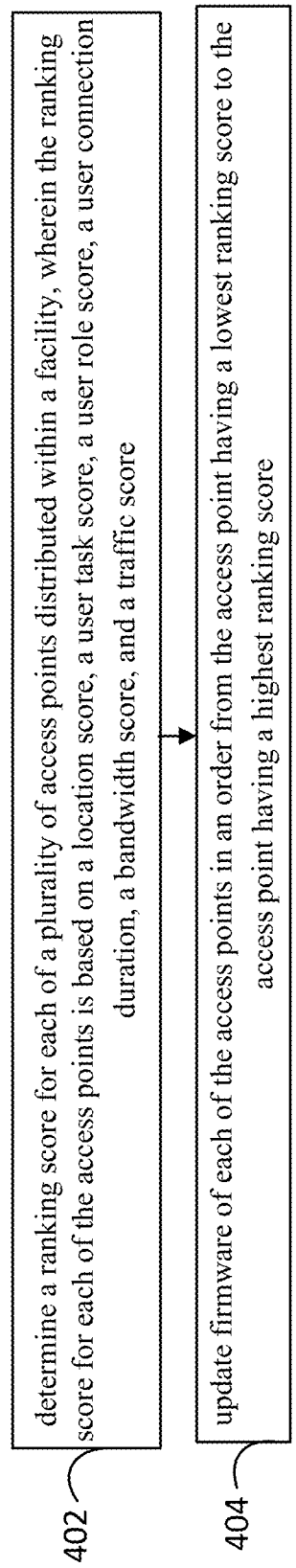
FIG. 4 is another flow chart of illustrative operations for access point updates, according to aspects of the disclosure.

FIG. 4 is another flow chart illustrating operations 400 that can be performed for updating access points distributed within a facility, according to aspects of the disclosure. Operations 400 may be performed, for example, by server 114 of FIG. 1. At least some of the operations 400 may be performed by a computer having a processor executing commands stored in a memory of the computer. Methods consistent with the present disclosure may include at least some, but not all, of the operations 400, performed in a different sequence. Furthermore, methods consistent with the present disclosure may include two or more of operations 400 performed overlapping in time, or almost simultaneously.

At block 402, a ranking score for each of a plurality of access points distributed within a facility is determined. The ranking score for each of the access points is based on a location score, a user task score, a user role score, a user connection duration, a bandwidth score, and a traffic score. The ranking score may also be based on a user reputation score. Determining the ranking score may include determining a weighted sum of the location score, the user task score, the user role score, the user connection duration, the bandwidth score, and the traffic score (and/or the user reputation score), such as by using Equation 1 above. In some scenarios, prior to determining the weighted sum, server 114 may determine a weight for each of the location score, the user task score, the user role score, the user connection duration, the bandwidth score, and the traffic score. Determining the weight may include performing an ordinal regression operation. Performing the ordinal regression operation may include using a machine-learning regression model trained with training data associated with a plurality of access points distributed within a different facility.

At block 404, firmware of each of the access points is updated in an order from the access point having the lowest ranking score to the access point having the highest ranking score. For example, the access point having the lowest ranking score may be associated with a device of a guest of the facility, and the access point having the highest ranking score may be associated with a device of a chief executive officer for the facility.

Hardware Overview

Figure 5:
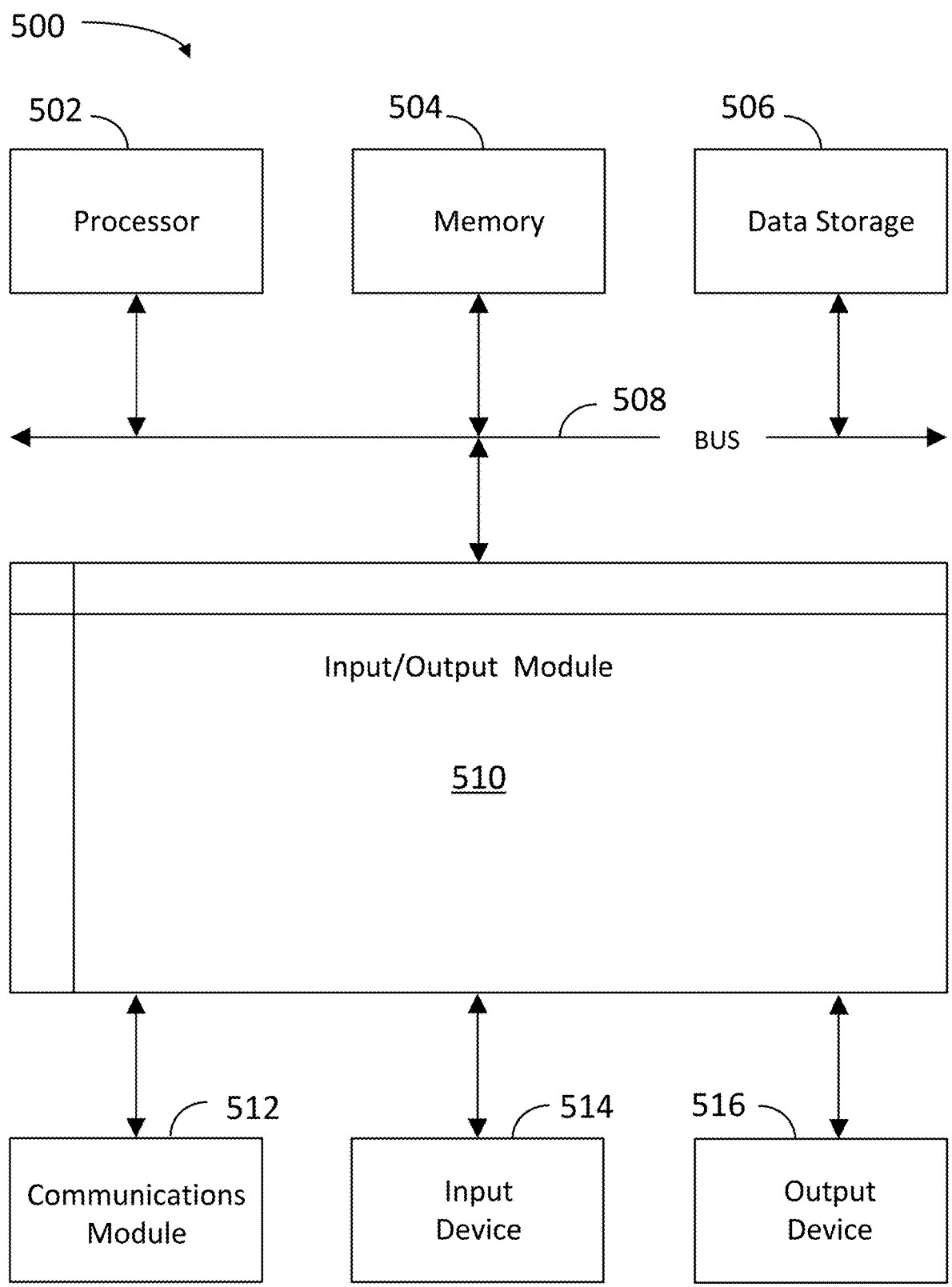
FIG. 5 is a block diagram illustrating an example computer system with which the access points, user devices, administrator devices, and servers of FIGS. 1 and 2 and the methods of FIGS. 3 and 4 can be implemented.

FIG. 5 is a block diagram illustrating an exemplary computer system 500 with which access points 102, server 114, administrator device 116, and/or user device 106 of FIGS. 1 and 2, and the methods of FIGS. 3 and 4, can be implemented. In certain aspects, the computer system 500 may be implemented using hardware or a combination of software and hardware, either in a dedicated network device, or integrated into another entity, or distributed across multiple entities.

Computer system 500 (e.g., server 114) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage 506 such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, the access points 102, user device 106, server 114, and/or administrator device 116 can be implemented using a computer system 500 in response to processor 502 executing one or more sequences of one or more instructions contained in memory 504. Such instructions may be read into memory 504 from another machine-readable medium, such as data storage 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 112) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and network devices. A client and network device are generally remote from each other and typically interact through a communication network. The relationship of client and network device arises by virtue of computer programs running on the respective computers and having a client-network device relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage 506. Volatile media include dynamic memory, such as memory 504. Transmission media include coaxial cables, copper wire, and fiber optics, including the wires forming bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   determining a ranking score for each of a plurality of access points distributed across at least two sub-regions of a facility;
   determining, based on a combination of the ranking scores for the access points physically located within a boundary of each of the at least two sub-regions, a sub-region ranking score for each sub-region;
   identifying, for a sub-region with a low sub-region ranking score, a plurality of sub-sets of the access points in that sub-region;

determining, based on a combination of the ranking scores for the access points in each sub-set, a sub-set ranking score for each sub-set;

identifying a sub-set associated with a low sub-set ranking score;

performing an update of the access points in the identified sub-set with the low sub-set ranking score;

determining whether the update of the access points of the identified sub-set with the low sub-set ranking score is a successful update;

if the update of the access points of the identified sub-set with the low sub-set ranking score is successful:
  identifying the sub-set with a higher sub-set ranking score of the sub-set ranking scores; and
  performing an update of the access points of the identified sub-set with the higher sub-set ranking score;

if the update of the access points of the identified sub-set with the low sub-set ranking score is not successful:
  performing an upgrade rollback for the identified sub-set with the low sub-set ranking score; and
  ceasing upgrade operations for the access points.

2. The computer-implemented method of claim 1, wherein the facility is one of an airport, an office building, a stadium, a shopping mall, a station, a park, a library, or a public wireless network access area.

3. The computer-implemented method of claim 1, wherein the two sub-regions include a first floor and a second floor of the facility.

4. The computer-implemented method of claim 3, wherein determining the ranking score for each of the plurality of access points comprises determining the ranking score for each access point based on at least one of a location score, a user task score, a user role score, a user connection duration, a bandwidth score, and a traffic score associated with that access point.

5. The computer-implemented method of claim 4, wherein determining the ranking score for each of the plurality of access points comprises determining, for each access point, a weighted sum of the location score, the user task score, the user role score, the user connection duration, the bandwidth score, and the traffic score associated with that access point.

6. The computer-implemented method of claim 5, further comprising determining a weight for each of the location score, the user task score, the user role score, the user connection duration, the bandwidth score, and the traffic score.

7. The computer-implemented method of claim 6, wherein determining each weight comprises using a machine-learning regression model.

8. The computer-implemented method of claim 1, wherein the update is a firmware update or software update.

9. The computer-implemented method of claim 1, wherein each of the plurality of sub-sets provides at least partially redundant spatial signal coverage to at least another one of the plurality of sub-sets.

10. The computer-implemented method of claim 1, wherein each of the plurality of sub-sets provides at least partially redundant spatial signal coverage to all of the other sub-sets.

11. A computer-implemented method, comprising:
determining a ranking score for each of a plurality of access points distributed within a facility, wherein determining the ranking score for each of the access points comprises:
  determining a weight for each of a location score, a user task score, a user role score, a user connection duration, a bandwidth score, and a traffic score, wherein determining the weight comprises performing an ordinal regression operation using a machine-learning model with training data associated with a plurality of access points distributed within a different facility; and
  determining a weighted sum of the location score, the user task score, the user role score, the user connection duration, the bandwidth score, and the traffic score; and
updating firmware of each of the access points in an order from the access point having a lowest ranking score to the access point having a highest ranking score.

12. The computer-implemented method of claim 11, wherein the access point having the lowest ranking score is associated with a device of a guest of the facility, and wherein the access point having the highest ranking score is associated with a device of a chief executive officer for the facility.

13. A system, comprising:
a memory storing instructions; and
one or more processors configured to execute the instructions to:
  determine a ranking score for each of a plurality of access points distributed across at least two sub-regions of a facility;
  determine, based on a combination of the ranking scores for the access points in each of the at least two sub-regions, a sub-region ranking score for each sub-region;
  identify, for the sub-region with a lowest sub-region ranking score of the sub-region ranking scores, a plurality of sub-sets of the access points in that sub-region;
  determine, based on a combination of the ranking scores for the access points in each sub-set, a sub-set ranking score for each sub-set;
  identify the sub-set with a lowest sub-set ranking score of the sub-set ranking scores; and
  perform an update of the access points of the identified sub-set with the lowest sub-set ranking score;
  determine whether the update of the access points of the identified sub-set with the low sub-set ranking score is a successful update;
  if the update of the access points of the identified sub-set with the low sub-set ranking score is successful:
    identify the sub-set with a higher sub-set ranking score of the sub-set ranking scores; and
    perform an update of the access points of the identified sub-set with the higher sub-set ranking score;
  if the update of the access points of the identified sub-set with the low sub-set ranking score is not successful:
    perform an upgrade rollback for the identified sub-set with the low sub-set ranking score; and
    cease upgrade operations for the access points.

* * * * *